US012046435B2

United States Patent
(12) United States Patent
Madhusoodanan et al.

(10) Patent No.: US 12,046,435 B2
(45) Date of Patent: Jul. 23, 2024

(54) STATE-INDICATING DEVICE FOR LOW CURRENT APPLICATIONS WITH WIDER OPERATING RANGE

(71) Applicant: SCHNEIDER ELECTRIC INDUSTRIES SAS, Rueil Malmaison (FR)

(72) Inventors: Vimal Adithiya Tellicherry Madhusoodanan, Karnataka (IN); Abdul Latheef Shaik, Karnataka (IN); Ashok Ramlal Richhawal, Karnataka (IN); Narasimha Murthy Veerakariyappa, Karnataka (IN)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 0 days.

(21) Appl. No.: 18/133,821

(22) Filed: Apr. 12, 2023

(65) Prior Publication Data

US 2023/0326698 A1 Oct. 12, 2023

(30) Foreign Application Priority Data

Apr. 12, 2022 (IN) ............................ 202231021763

(51) Int. Cl.
*H01H 71/04* (2006.01)
*H01H 71/10* (2006.01)
*H01H 71/46* (2006.01)

(52) U.S. Cl.
CPC ........ *H01H 71/04* (2013.01); *H01H 71/1018* (2013.01); *H01H 71/46* (2013.01)

(58) Field of Classification Search
CPC ........ H01H 71/04; H01H 71/46; H01H 71/70; H01H 71/0228; H01H 71/465;
(Continued)

(56) References Cited

U.S. PATENT DOCUMENTS 4,181,838 A 1/1980 Neuser et al.
2017/0076577 A1* 3/2017 Thomas ................ H01H 71/04

FOREIGN PATENT DOCUMENTS

CN 212625429 U 2/2021
DE 102009022073 A1 11/2010
(Continued)

OTHER PUBLICATIONS

European Search Report for EP23167238 mailed on Sep. 28, 2023.

*Primary Examiner* — Bryan R Perez
(74) *Attorney, Agent, or Firm* — Rivka Friedman

(57) ABSTRACT

The present invention relates to a state-indicating device (100) for circuit breaker with test function disclose. The state-indicating device (100) includes signal transmission to plurality of indicating devices (100) from the circuit breaker by means of linking features between the circuit breaker and indicating device and also linkage between one indicating device and other indicating device. Indicating device includes a mechanical linkage comprising an actuator connected to hook member (7) and tripping bar (8) with stainless-steel rod (9) being configured to: operate mechanical plate (6) and lever (10), test function actuator (4); to push the microswitch button (19) of a microswitch assembly (12) by selectively On/Off (OF), Signal Default (SD) and SD+OF causing the circuit to change status from Normally Open (NO) to Normally Close (NC); and to show the trip status of the circuit breaker which is mounted to, say the right side of the invented state-indicating device (100).

12 Claims, 3 Drawing Sheets

(58) Field of Classification Search
CPC ...... H01H 71/10; H01H 71/462; H01H 71/68; H01H 71/0207; H01H 71/1009; H01H 71/08; H01H 71/24; H01H 71/123; H01H 83/04; H01H 83/20
See application file for complete search history.

(56) References Cited

FOREIGN PATENT DOCUMENTS

| | | | |
|---|---|---|---|
| FR | 2814850 | A1 | 12/2005 |
| KR | 19990057116 | A | 7/1999 |
| WO | 2019185996 | A1 | 10/2019 |

* cited by examiner

STATE-INDICATING DEVICE FOR LOW CURRENT APPLICATIONS WITH WIDER OPERATING RANGE

FIELD OF INVENTION

The present invention in general relates to state-indicating devices for low voltage and low current electrical apparatus. More particularly, the invention relates to a multi-function state-indicating device for circuit breaker provided with test function.

BACKGROUND OF THE INVENTION

In electronic systems, individual circuit components are typically protected from short-circuiting and excessive magnitude of currents by a fuse or a circuit breaker interposed between the component and a power supply. Large numbers of such protection devices may be found within any given system, depending upon the number of individual components contained therein. This has given rise to the need for fuse and circuit breaker state-indicating devices which allow for the easy and rapid location of a tripped, failed or "blown" protection device within an electronic system.

In some industrial applications, a control device such as a Programmable Logic Centre (PLC) monitors the power distribution system by reading the state of the circuit breaker via a circuit breaker state-indicating device.

In a low-voltage power distribution system, with the development of integration and networking of an electric power system, low-voltage elements with various fault indication functions have become a trend. Generally, a fault alarm indicating device refers to an accessory device for providing a fault alarm and an indication when a fault occurs in the circuit breaker. The fault accessory device is used to monitor a fault state of the circuit breaker or detect a fault type (under-voltage, over-current, short-circuit and the like) of the circuit breaker, and indicate an alarm indication state caused by the fault of the load circuit, so that an operator may timely discover the fault and take necessary maintenance or replacement. When a fault occurs in the circuit breaker, the fault accessory device provides a fault alarm signal.

There are two types of circuit breaker state-indicating devices known in the art, referred to as iOF and iOF+SD24. One iOF type circuit breaker state-indicating devices is disclosed in the prior patent document no. CN212625429U, usually used for high current application or PLC low current application.

Therefore, there is a need for multi-function indicating device for PLC application to be operated with a range of current more than 10 mA and current up to 100 mA and voltage operating limit up to 220V DC and 250 V AC to meet the market demands for all variants particularly for Daisy chain application where test function is crucial for customer.

With a view therefore to overcome the technical problems associated with conventional state indicating devices, the inventors felt the need to develop a novel and multi-function indicating device for circuit breaker with test function disclosed in this idea. This multi-function indicating device includes signal transmission to three indicating devices from the circuit breaker by means of linking features between the circuit breaker and indicating device.

OBJECT OF THE INVENTION

Accordingly, an object of the invention is to provide a multi-function state-indicating device that can be applicable to PLC low current, and voltage and also high current and voltage use to satisfy the market demand with a unique design.

SUMMARY OF THE INVENTION

Accordingly, the present invention provides a state-indicating device linked to a circuit breaker indicating the status thereof with test function, said circuit breaker having an On/Off (OF) function and a Signal Default (SD) function, wherein said state-indicating device comprises:

- a housing;
- a microswitch assembly attached within said housing, said microswitch assembly comprising at least one microswitch button;
- a mechanical linkage linked to said microswitch assembly, and configured to selectively operate said microswitch assembly, wherein said mechanical linkage comprises:

- a mechanical plate;
- a lever;
- a test function actuator coupled with said lever;
- a tripping assembly mounted on said mechanical plate; and
- an actuator coupled with said tripping assembly and configured to:
  - actuate said microswitch button of said microswitch assembly based on signals corresponding to said On/Off (OF) function, said Signal Default (SD) function and a combination of said SD function and said OF function (SD+OF) that allow said microswitch assembly to change from Normally Open (NO) state to Normally Close (NC) state, and vice versa; and
  - indicate the trip status of the circuit breaker linked to said state-indicating device, and wherein said test function actuator is configured to actuate said microswitch button without operating said actuator to perform a test of a make or break operation with said lever without switching ON said circuit breaker linked to said state-indicating device.

The state-indicating device, as disclosed, is installed together with the circuit breaker by means of precision snaps and mechanical connections designed to interact with each other and share the status thereby.

According one particular embodiment of the present invention, said state-indicating device is configured for signal transmission to plurality of state-indicating devices from the circuit breaker by means of linking features between the circuit breaker and indicating device and linkage between one indicating device and other indicating device.

According one particular embodiment of the present invention, said test function actuator comprises a test lever arm such that, when a test current is passed through said state-indicating device, said test lever arm comes in contact with the lever to actuate said microswitch assembly to test said state-indicating device without installing said circuit breaker.

According to one embodiment of the present invention, the state-indicating device said tripping assembly comprises a hook member a tripping bar, and a connecting stainless-steel rod linking said hook member with said actuator such that upon actuation of said actuator, said tripping assembly is biased to rotate at a predefined angle through said hook member and latches with the tripping bar and locks therein maintaining said predefined angle and thereby said tripping assembly allows to indicate the change of said trip status of said circuit breaker to either On, Off, or Trip.

According to one embodiment of the invention, said mechanical linkage comprises a lever spring assembled to said lever wherein upon actuation of said actuator, said lever actuates said microswitch button to transmit a signal to said circuit breaker, indicating said trip status of said circuit breaker, and said lever spring provides a biasing force to said lever to restore the position of lever with respect to said mechanical plate when the state of the circuit breaker has been indicated.

According to one embodiment of the invention, said microswitch assembly comprises a trip microswitch and a switch microswitch, said microswitch assembly being configured to transmit a signal from a common contact to a Normally Open (NO) or a Normally Close (NC) contact.

According to one embodiment of the invention, said actuator comprises: a trip actuator being operably coupled with said trip microswitch; and a switch actuator being operably coupled with said switch microswitch.

According to one embodiment of the invention, said switch actuator selectively engages with said microswitch button on said switch microswitch and said trip actuator selectively engages with said microswitch button to actuate said trip microswitch using the selective function of SD+OF with reset function and test function.

According to one embodiment of the invention, said housing comprises:

a bottom case having plurality of engraved holding provisions, said bottom case being provided with at least one stationary contact and at least one movable contact; and a cover member removably attached to said bottom case, According to one embodiment of the invention, the bottom case is provided with plurality of terminal lugs to facilitate an electrical connection between plurality of output terminals of said microswitch assembly and said stationary contact and the movable contact of said state-indicating device.

According to another embodiment of the invention, the plurality of output terminals are box terminals designed for higher isolation distance for higher and lower voltage and current operating conditions.

According to one embodiment of the invention, the movable contact is a silver or gold plated contact with 0.6 mm or more isolation distance custom designed for higher performance.

According to one embodiment of the invention, the NO (Normally Open) contact is a silver or gold plated contact.

According to one embodiment of the invention, the NC (Normally Closed) contact is a silver or gold plated contact.

According to another embodiment of the invention, the microswitch includes a plurality of output terminals electrically connected to one of the stationary contact and the movable contact, respectively.

According to yet another embodiment of the invention, the circuit breaker state-indicating device further includes a plurality of wires, wherein one end of each wire is electrically connected to one of the plurality of output terminals of the microswitch, and the other end of each wire is soldered to one of the plurality of output terminals with robust splicing methods withstanding higher mechanical vibration and higher voltage.

According to one embodiment of the invention, said other end of each wire is soldered with tapered joint which is designed with 70N or greater separation force to one of the pluralities of output terminals to withstand higher mechanical vibration and higher voltage.

BRIEF DESCRIPTION OF DRAWINGS

For better understanding, an illustrative embodiment of the invention will now be described with reference to the accompanying drawings. It will however be appreciated that the embodiment exemplified in the drawings is merely illustrative and not limitative to the scope of the invention, because it is quite possible, indeed often desirable, to introduce a number of variations in the embodiment that have been shown in the drawings. In the accompanying drawings.

DETAILED DESCRIPTION OF THE INVENTION

In the following, numerous specific details are set forth to provide a thorough description of the preferred embodiment. Those skilled in the art will recognize and appreciate that, despite of the detailed nature of the exemplary embodiment provided here; changes and modifications may be applied to said embodiments without limiting or departing from the generally intended scope. Like numbers refer to like elements throughout.

Figure 1:
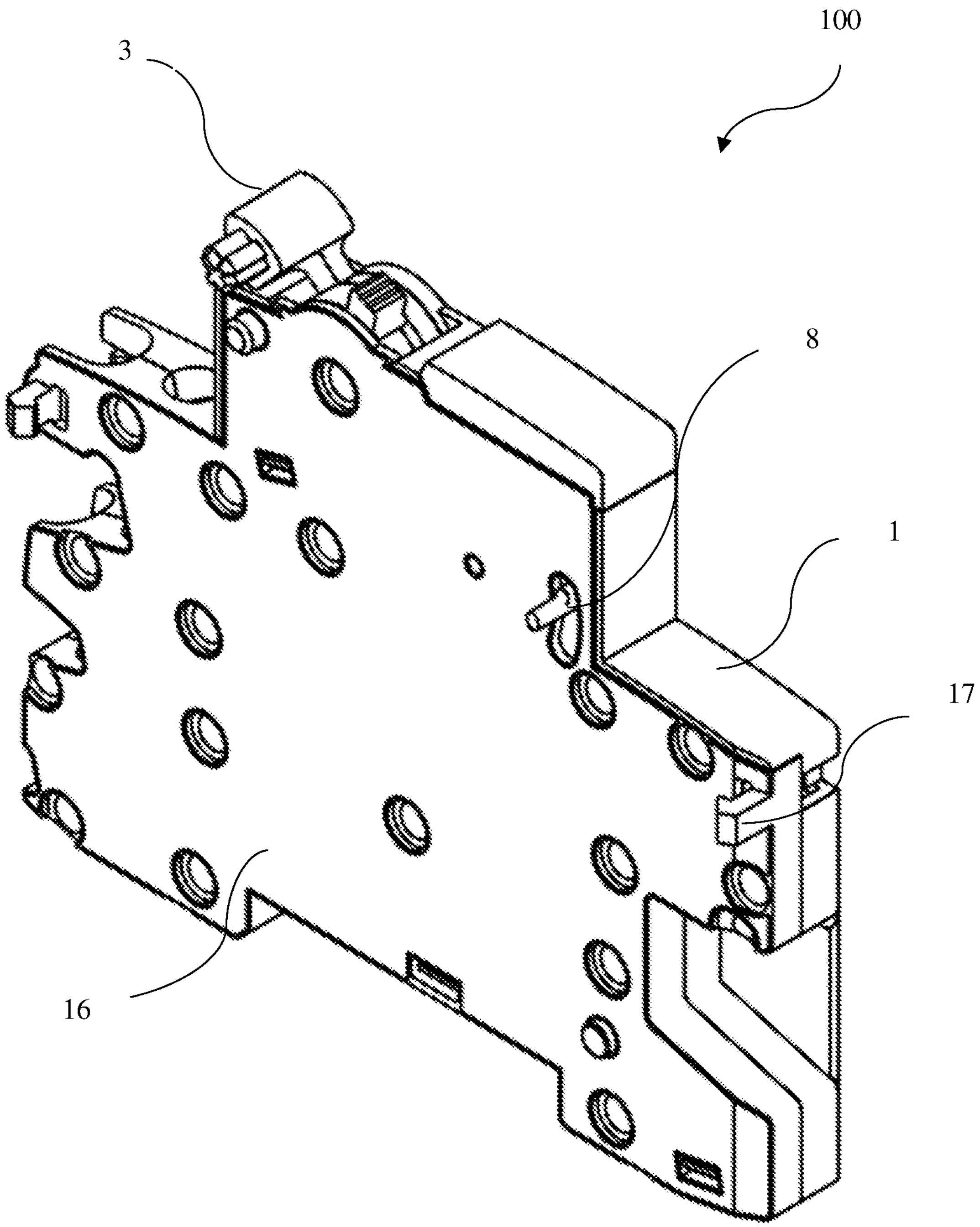
FIG. 1 depicts a perspective view of the invented state-indicating device according to an embodiment of the present invention.
Figure 2:
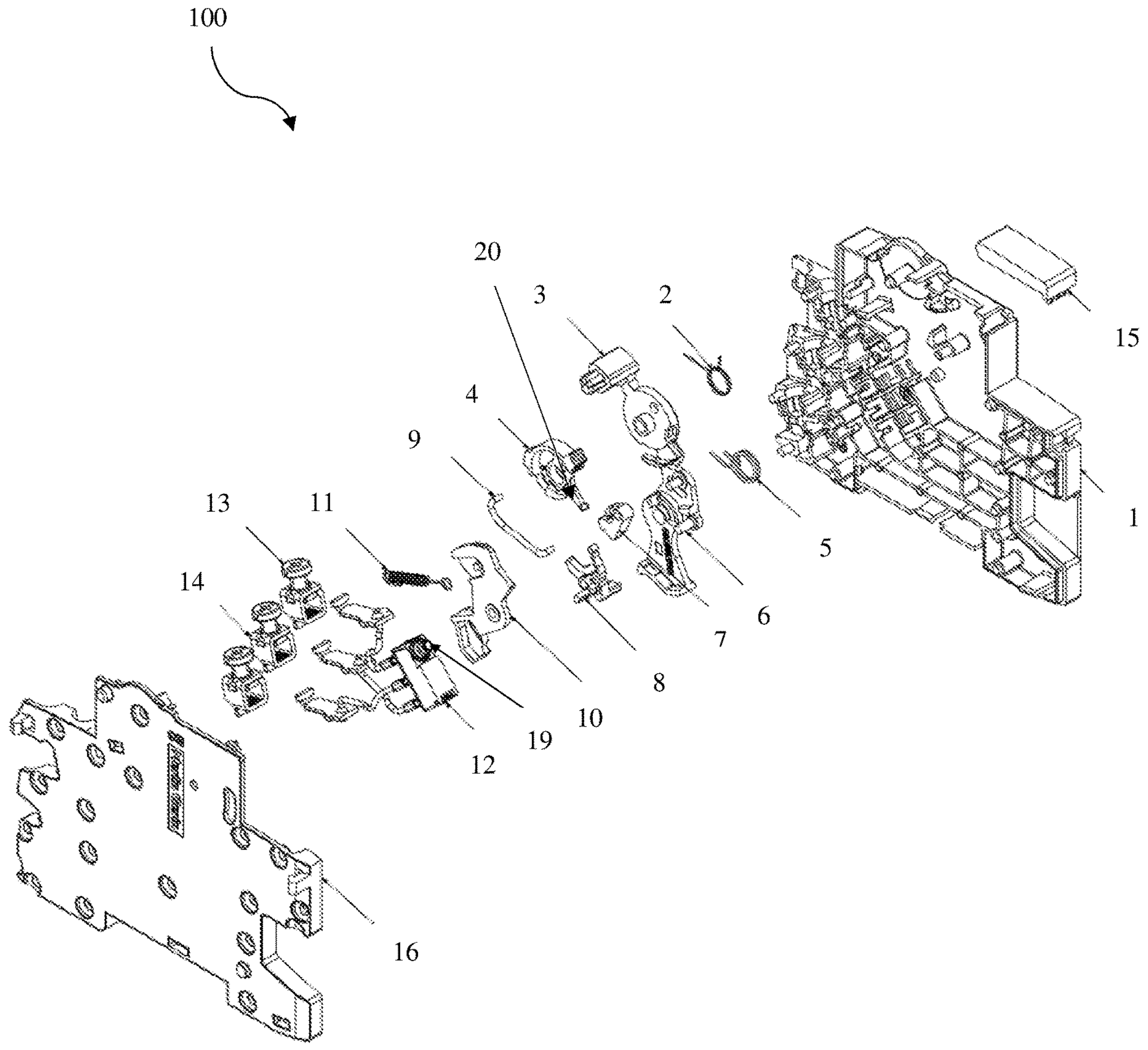
FIG. 2 shows an exploded view of the state-indicating device with its cover opened and interior of the indicating device shown with all the components assembled therein.

In the accompanying drawings, FIG. 1 depicts a perspective view of a structural diagram of indicating device for a protective device such as a circuit breaker according to one embodiment of the invention. The state-indicating device (100) comprises: a housing, a mechanical linkage and the microswitch assembly (12) being mounted at least partially within the housing. FIG. 2 illustrates the components at the interior of said housing in a non-assembled manner with an exploded view of the state-indicating device (100). The housing includes a bottom case (1) and a cover member (16). The cover member (16) is fitted on the bottom case (1). The bottom case (1) holds all the complete mechanism pertaining to said state-indicating device (100). According to the preferred embodiment of the invention, said circuit breaker comprising an On/Off (OF) function and a Signal Default (SD) function. The Signal Default (SD) function of said circuit breaker can also be referred as tripping function of the circuit breaker.

The state-indicating device (100) includes a mechanical linkage comprising an actuator (3) which is assembled on the bottom case (1). The actuator (3) is connected to hook member (7) and tripping bar (8) with stainless-steel rod (9). The stainless-steel rod (9) is configured to create a link between the actuator (3) and said hook member (7). The mechanical linkage being configured to operate mechanical plate (6) and lever (10), test function actuator (4). The mechanical plate (6) houses the trip mechanism, which consist of the hook member (7) and tripping bar (8) linked with the actuator (3) by a connecting stainless-steel rod (9). On actuation of the actuator (3) the rotation motion is transferred to the mechanism through hook member (7) and latches with the tripping bar (8) locks the mechanism there by allowing the mechanism part, which consist of the mechanical plate (6), hook member (7), tripping bar (8), stainless-steel rod (9), the actuator (3) and the actuator spring (2) to rotate to a desired angle precisely maintained, which allows to change in status to On/Off/Trip.

The test function actuator (4) is assembled on the actuator (3). The test function actuator (4) is configured to make and break contact with said lever (10). Further, the test function actuator (4) comprises a test lever arm (20) such that, when a test current is passed through said state-indicating device, said test lever arm (20) comes in contact with the lever (10). The lever (10) then goes on to actuate said microswitch to test said state-indicating device without installing said circuit breaker. This also referred as test function of the state-indicating device. Further, a mechanical plate spring (5) along with said hook member (7) and said tripping bar (8) is engaged with said mechanical plate (6). Mechanical plate spring (5) provides the force necessary to prevent the mechanism which consist of the mechanical plate (6), hook member (7), tripping bar (8), stainless-steel rod (9), the actuator (3) and the actuator spring (2) from returning to original position and retain the state of operation.

The lever (10) is assembled on the mechanical plate (6) to actuate the microswitch button (19) for On/Off and trip indication. Further, a lever spring (11) is assembled onto said lever (10) and similarly and actuator spring (2) is assembled onto said actuator (3). The lever spring (11) helps in reset function when the state of the breaker has been indicated and also to maintain the position with mechanism of lever (10) with mechanical plate (6). The actuator spring (2) helps to retain the position of the actuator (3) on fault indication of the breaker also designed in such a way the lever (10) is returned first to its position before the actuator (3). This function of said springs are also referred as reset function of the state-indicating device (100).

Figure 3:
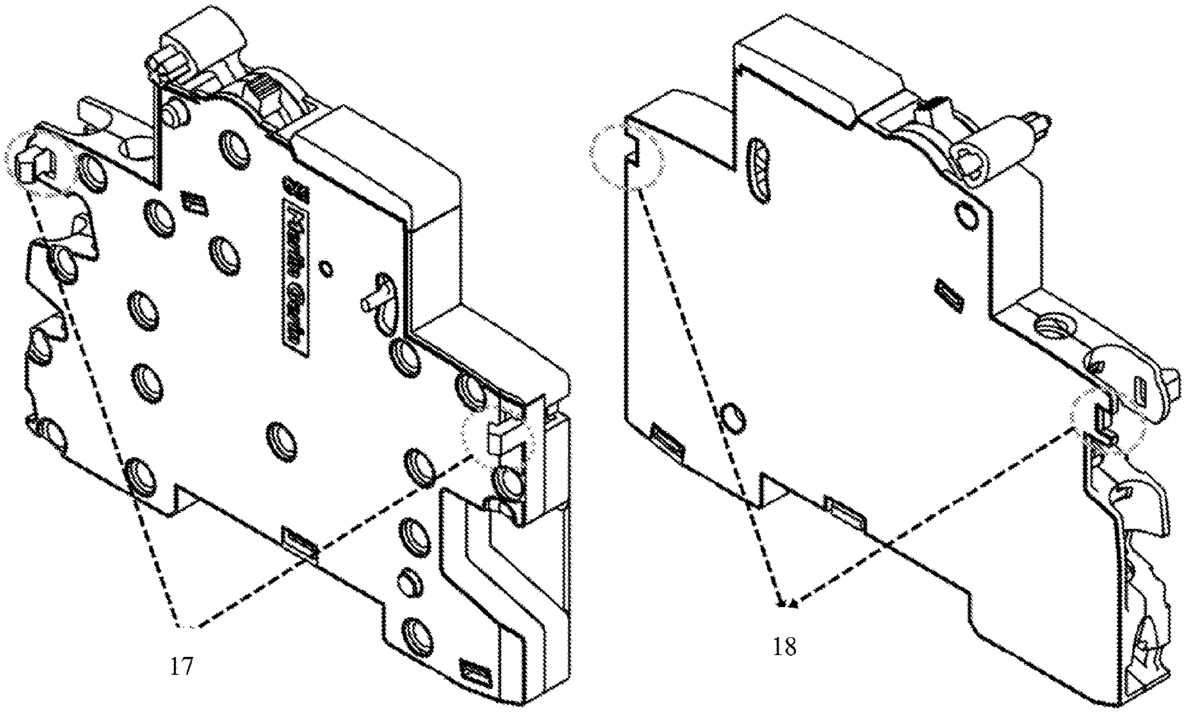
FIG. 3 shows precision snaps and mechanical connections design indicated therein, designed to interact with each other and share the status.

With regard to FIG. 3 of the accompanying drawings, precision snaps (17) and mechanical connections (18) are designed to interact with each other and share the status through tripping bar (8) from circuit breaker to the state-indicating device (100) and also from one state-indicating device (100) to the other similar devices on its side.

According to the embodiment as shown in FIG. 2, the actuator (3) comprises a trip actuator and a switch actuator. The switch actuator selectively engages with said microswitch button (19) and thereby selectively actuates it. Further, the trip actuator selectively engages with said microswitch button (19) to actuate said trip microswitch using the selective function of SD+OF with reset function and test function. The microswitch assembly (12) is assembled on the bottom case (1) transmitting the signal from common contact to Normally Open (NO) or Normally Close (NC) contacts. Further the mechanical linkage is configured to push the microswitch button (19) by selectivity of On/Off (OF), Signal Default (SD), and SD+OF causing the circuit to change status from Normally Open (NO) to Normally Close (NC). With the aid of said mechanical linkage, trip status of the circuit breaker is shown which, according to one embodiment of the invention, is mounted to the right side of the state-indicating device (100). According to the preferred embodiment, a cover member (16) is assembled on the bottom case (1) to enclose the products and components inside of the state-indicating device (100). Further, a front face cover (15) is removably attached on the bottom case (1) and cover to achieve IP protection on the front case of the state-indicating device (100).

The state-indicating device (100) further comprises an on-off actuator provided with a microswitch. The microswitch assembly (12), according to one preferred embodiment of the invention, is an on-off type microswitch that is selectively engaged to actuate a button of the on-off microswitch using the selective function of On/Off (OF) with test function. The microswitch assembly (12) comprises a switch microswitch and a trip microswitch. The trip actuator selectively engages to actuate a button of the microswitch assembly (12) using the selective function of SD with reset function and test function.

The state-indicating device (100) further includes a plurality of wires to be electrically engaged with corresponding microswitch assembly (12). According to a preferred embodiment, one end of each said wires is electrically connected to one of the plurality of output terminals of the microswitch assembly (12), and the other end of each wire is soldered to one of the plurality of output terminals with robust splicing methods withstanding higher mechanical vibration and higher voltage. In said state-indicating device (100), plurality of terminal lugs (14) and terminal screws (13) are provided. The terminal lugs (14) are assembled on the bottom case (1) and are screwed thereto to help create cable connection with said state-indicating device (100). The terminal screws (13) are assembled on the terminal lugs (14) to facilitate said cable connections. The plurality of output terminals, in a preferred embodiment are box terminals. Such box terminals, according to one object of the invention, are designed for higher isolation distance for higher and lower voltage and current operating conditions. The working procedure of the box terminals are not discussed for the sake of brevity.

Each of the junction points of said other end of said each wire is soldered. In particular, said other end with tapered joint which is designed with 70N or greater separation force to one of the pluralities of output terminals to withstand higher mechanical vibration and higher voltage. Further, The plurality of output terminals of said microswitch assembly (12) are electrically connected to one of the stationary contact and the movable contact with in the microswitch assembly (12) of the state-indicating device (100) to provide the continuity only when actuated by the microswitch button (19). The movable contact is formed with a silver or gold plated contact. The contacts are custom designed having 0.6 mm or more isolation distance custom designed for higher performance. Furthermore, the Normally Open (NO) contact and the Normally Closed (NC) contact are silver or gold plated contact.

As already mentioned, the foregoing description is illustrative of the invention and not limitative to its scope, because it will be apparent to persons skilled in the art to devise other alternative embodiments without departing from the broad ambit of the disclosures made herein.

PART-LIST

State-indicating device (100)
Bottom case (1)
Actuator spring (2)
Actuator (3)
Test function actuator (4)
Mechanical plate spring (5)
Mechanical plate (6)
Hook member (7)
Tripping bar (8)
Stainless-steel rod (9)
Lever (10)
Lever spring (11)
Microswitch assembly (12)
Terminal screws (13)
Terminal lugs (14)
Front face cover (15)

Cover member (16)
Precision snaps (17)
Mechanical connections (18)
Microswitch button (19)
Test lever arm (20)

We claim:

1. A state-indicating device (100) linked to a circuit breaker indicating the status thereof with test function, said circuit breaker having an On/Off (OF) function and a Signal Default (SD) function, wherein said state-indicating device (100) comprises:

a housing;

a microswitch assembly (12) attached within said housing, said microswitch assembly (12) comprising at least one microswitch button (19);

a mechanical linkage linked to said microswitch assembly (12), and configured to selectively operate said microswitch assembly (12), wherein said mechanical linkage comprises:

a mechanical plate (6);

a lever (10), a test function actuator (4) coupled with said lever (10)

a tripping assembly mounted on said mechanical plate (6); and an actuator (3) coupled with said tripping assembly and configured to:

actuate said microswitch button (19) based on signals corresponding to said On/Off (OF) function, said Signal Default (SD) function and a combination of said SD function and said OF function (SD+OF) that allow said microswitch assembly (12) to change from Normally Open (NO) state to Normally Close (NC) state, and vice versa; and indicate the trip status of the circuit breaker linked to said state-indicating device (100), and wherein said test function actuator (4) is configured to actuate said microswitch button (19) without operating said actuator (3) to perform a test of a make or break operation with said lever (10) without switching ON said circuit breaker linked to said state-indicating device (100).

2. The state-indicating device (100) as claimed in claim 1, wherein said tripping assembly comprises a hook member (7), a tripping bar (8), and a connecting stainless-steel rod (9) linking said hook member (7) with said actuator (3), wherein upon actuation of said actuator (3), said tripping assembly is biased to rotate at a predefined angle through said hook member (7) and latches with the tripping bar (8) and locks therein maintaining said predefined angle and thereby said tripping assembly allows to indicate the change of said trip status of said circuit breaker to either On, Off, or Trip.

3. The state-indicating device (100) as claimed in claim 1, wherein said mechanical linkage comprises a lever spring (11) assembled to said lever (10), wherein upon actuation of said actuator (3), said lever (10) actuates said microswitch button (19) to transmit a signal to said circuit breaker, indicating said trip status of said circuit breaker, and wherein said lever spring (11) provides a biasing force to said lever (10) to restore the position of said lever (10) with respect to said mechanical plate (6) when the state of the circuit breaker has been indicated.

4. The state-indicating device (100) as claimed in claim 1, wherein said test function actuator (4) comprises a test lever arm (20) such that, when a test current is passed through said state-indicating device (100), said test lever arm (20) comes in contact with the lever (10) to actuate said microswitch assembly (12) to test said state-indicating device (100) without switching ON said circuit breaker.

5. The state-indicating device (100) as claimed in claim 1, wherein said state-indicating device (100) comprises an actuator spring (2) attached with said actuator (3) providing biasing force to restore the position of the actuator (3) upon indication of the circuit breaker, such that the restoration of said actuator (3) is preceded by said restoration of said lever (10) to its position.

6. The state-indicating device (100) as claimed in claim 1, wherein said state-indicating device (100) comprises a mechanical plate spring (5) providing biasing force to said tripping assembly preventing from returning to a normal state while maintaining said predefined angle.

7. The state-indicating device (100) as claimed in claim 1, wherein said microswitch assembly (12) comprises a trip microswitch and a switch microswitch, said microswitch assembly (12) being configured to transmit a signal from a common contact to a Normally Open (NO) or a Normally Close (NC) contact.

8. The state-indicating device (100) as claimed in claim 7, wherein said actuator (3) comprises:

a trip actuator being operably coupled with said trip microswitch; and a switch actuator being operably coupled with said switch microswitch.

9. The state-indicating device (100) as claimed in claim 1, wherein said switch actuator selectively engages with said microswitch button (19) on said switch microswitch and said trip actuator selectively engages with said microswitch button (19) to actuate said trip microswitch using the selective function of SD+OF with reset function and test function.

10. The state-indicating device (100) as claimed in claim 1, wherein said housing comprises:

a bottom case (1) having plurality of engraved holding provisions, said bottom case is provided with at least one stationary contact and at least one movable contact; and a cover member (16) removably attached to said bottom case (1).

11. The state-indicating device (100) as claimed in claim 10, wherein the bottom case (1) is provided with plurality of terminal lugs (14) to facilitate an electrical connection between plurality of output terminals of said microswitch assembly (12) and said stationary contact and the movable contact of said state-indicating device (100).

12. The state-indicating device (100) as claimed in claim 11, wherein said stationary contact and said movable contact are gold plated contacts having a separation distance of 0.6 mm therebetween.

* * * * *